United States Patent [19]
Shibata

[11] Patent Number: 5,921,489
[45] Date of Patent: Jul. 13, 1999

[54] OSCILLATE MECHANISM FOR A FISHING SPINNING REEL

[75] Inventor: Takashi Shibata, Tokyo, Japan

[73] Assignee: Daiwa Seiko, Inc., Tokyo, Japan

[21] Appl. No.: 08/925,670

[22] Filed: Sep. 9, 1997

[30] Foreign Application Priority Data

Sep. 9, 1996 [JP] Japan ................................ 8-237986
Mar. 31, 1997 [JP] Japan ................................ 9-080933

[51] Int. Cl.$^6$ .............................................. A01K 89/015
[52] U.S. Cl. ................................. 242/242; 242/230
[58] Field of Search ........................... 242/230, 241, 242/242

[56] References Cited

U.S. PATENT DOCUMENTS

| 3,948,465 | 4/1976 | Scusa ........................... 242/230 |
| 4,196,869 | 4/1980 | Shepherd ........................ 242/230 |
| 5,350,131 | 9/1994 | Baumgartner et al. ........... 242/242 |

FOREIGN PATENT DOCUMENTS

| 7007657 | 3/1970 | Germany. |
| 694177 | 9/1965 | Italy ............................. 242/242 |
| 8-154543 | 6/1996 | Japan. |
| 92-8122 | 11/1992 | Rep. of Korea. |

*Primary Examiner*—John P. Darling
*Attorney, Agent, or Firm*—Sughrue, Mion, Zinn, Macpeak & Seas, PLLC

[57] ABSTRACT

A fishing spinning reel includes an oscillate mechanism in which a protrusion is formed on the periphery of an idle gear which turns in association with the rotation of a handle. The protrusion engages with an oscillate groove of an oscillate slider which is provided on the rear end side of a spool shaft having a spool at the end. Thus, rotation of the handle is converted into the reciprocation of the spool to move the spool back and forth. In the fishing spinning reel, the oscillate groove includes: an inclined portion which is inclined in the front-to-rear direction of the spool shaft; and straight portions which extend respectively from both ends of the inclined portion in such a manner that the straight portions are substantially perpendicular to the spool shaft.

6 Claims, 13 Drawing Sheets

OSCILLATE MECHANISM FOR A FISHING SPINNING REEL

BACKGROUND OF THE INVENTION

1. Field of the Invention

This invention relates to an improvement of a fishing spinning reel having an oscillate mechanism.

2. Description of the Related Art

As is well known in the art, in general a fishing spinning reel is designed as follows: A semi-circular bail is coupled through bail supporting members to the ends of a pair of supporting arms provided on a rotor in such a manner that it is swingable to take a fishing line take-up position and a fishing line let-out position. When, with the bail set at the fishing line let-out position, terminal tackles which include the hook, the float, etc. are thrown, the fishing line is spirally let out from the spool. On the other hand, when, with the bail set at the fishing line take-up position, the rotor is turned with the handle to take up the fishing line, the fishing line is wound on the spool which reciprocates in association with the rotation of the rotor.

Figure 19:
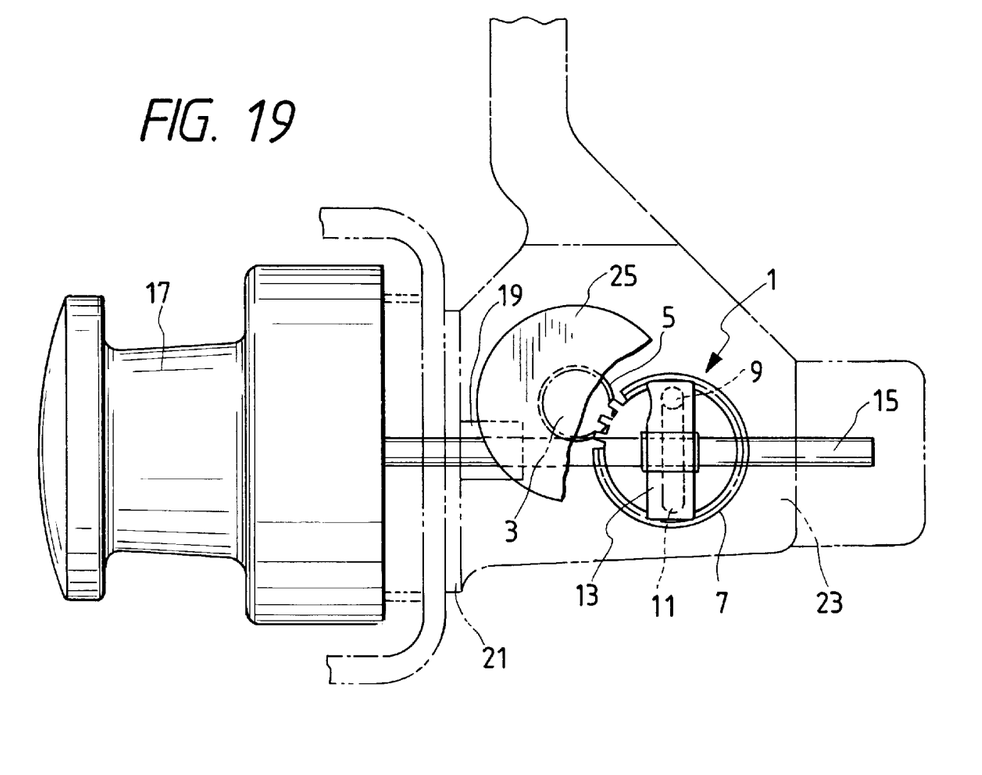
FIG. 19 is a side view of a conventional oscillate mechanism.

An example of a conventional mechanism for moving the spool back and forth (reciprocate) in association with the rotation of the rotor is an oscillate mechanism as shown in FIG. 19.

The oscillate mechanism 1 is designed as follows: A handle shaft 3 has a gear 5 engages with an idle gear 7. A protrusion 9 is provided on the periphery of one side surface of the idle gear 7. On the other hand, an oscillate slider 13 having an oscillate groove 11, which is engaged with the protrusion 9, is secured to the rear end portion of a spool shaft 15. As shown in FIG. 19, heretofore, the oscillate groove 11 extended vertically, being perpendicular to the spool shaft 15, and a spool 17 was secured to the end of the spool shaft 15.

In FIG. 19, reference numeral 19 designates a pinion at the rear end of the rotor 21. The spool shaft 15 is inserted into the pinion 19 in such a manner that it is movable back and forth with respect to a reel body 23.

The pinion 19 is engages with a drive gear 25 fixedly mounted on the handle shaft 3. When, in order to take up the fishing line, the rotor 21 is turned through the drive gear 25 and the pinion 19 with a handle (not shown), the idle gear 7 also turns. As a result, the protrusion 9 moves on a circular orbit, and accordingly the oscillate slide 13 moves the spool shaft 15 along the oscillate groove 11 back and forth, and therefore the spool 17 is reciprocated in the same direction.

However, the above-described oscillate mechanism 1 suffers from the following difficulties: since the protrusion 9 moves on the circular orbit as was described above when the reciprocation of the spool 17 switches with respect to the rotation of a predetermined angle of the idle gear 7, the amount of displacement (movement) of the oscillate slider 13 is decreased and the spool 17 is decelerated. Therefore, the fishing line is wound more on the front end portion and the rear end portion of the fishing line winding surface of the spool 17 than on the remaining (substantially middle) portion. On the other hand, the speed of the spool is highest substantially at the middle of the reciprocation. Hence, the amount of fishing line wound on the middle of the spool 17 is less. Accordingly, the fishing-line wound surface is sunk at the middle portion of the spool, and raised at both end portions.

The fishing line wound on both end portions of the spool is liable to collapse as a result, resisting the fishing-line which is being let out of the spool. This fact makes it difficult to sufficiently throw the terminal tackles.

In order to increase the oscillate store to increase the line winding capacity, the oscillate mechanism 1, may be modified by increasing diameter of the idle gear 7 and the protrusion 9 is provided-at the periphery thereof, and by lengthening the oscillate groove 11 vertically. However, if the diameter of the idle gear 7 is increased, then the reel body 23 also increases in diameter, which increases the weight of the reel accordingly.

Figure 20:
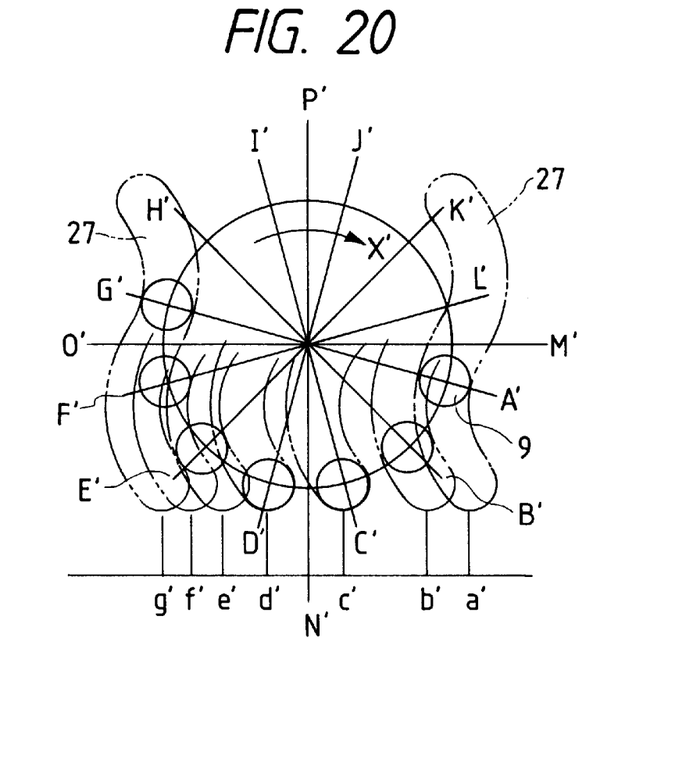
FIG. 20 is a diagram showing the abutment of a protrusion against the oscillate mechanism every angle of rotation of 30° of an idle gear in the oscillate mechanism shown in FIG. 19.

In order to overcome the above-described difficulty, U.S. Pat. No. 5,350,131, and Korean Utility Model Examined Publication No. 92-8122 have disclosed a spinning reel as shown in FIG. 20 in which the oscillate groove 27 is substantially S-shaped. In those spinning reels, the oscillate groove 27 is shaped in correspondence to the locus of movement of the protrusion 9 when it is assumed that the oscillate slider is moved in uniform motion.

However, it is true that the spinning reel shown in FIG. 20 also has the same difficulties as the one shown in FIG. 19.

Figure 21:
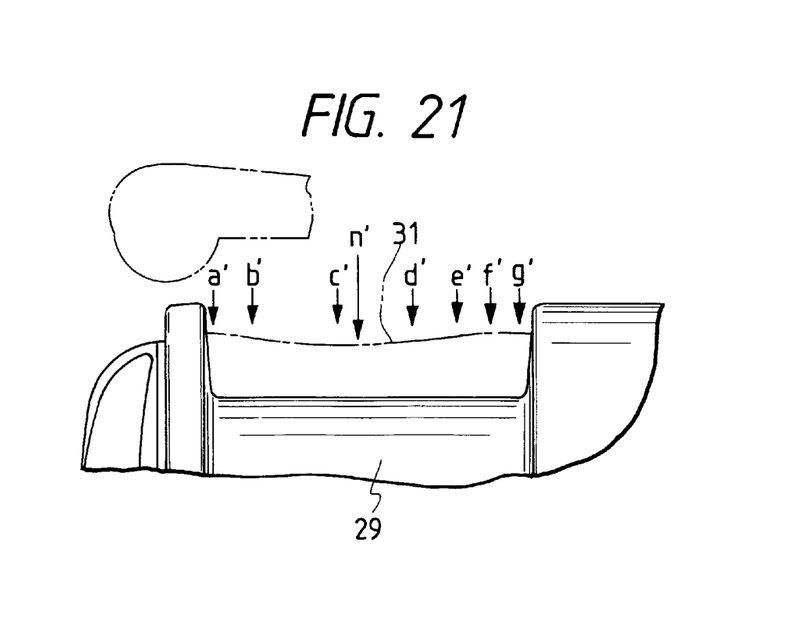
FIG. 21 is an explanatory diagram indicating the line-winding positions of a spool which correspond to the points A' through G' in FIG. 20.

FIG. 20 is a diagram showing the abutment of the protrusion 9 against the oscillate groove 27 at angular rotation intervals of 30° of the idle gear in the direction of the arrow X, and FIG. 21 shows the line winding positions of the spool 29 in correspondence to the points A' through G' in FIG. 20. In FIG. 20, the point A' corresponds to the rear end of the stroke of the spool 29 shown in FIG. 21, and the point G, to the front end of the stroke of the spool 29.

In the conventional oscillate mechanism in which the oscillator groove 27 is provided at the oscillate slider, because of its structure, the oscillate slider performs a uniform speed motion with an angular width of rotation of 90° between the points D' and G' and between the points J' and A'. However, when the reciprocation of the spool is switched at the F' through H' points and-at the L' through B' points, with respect to the rotation of a predetermined angle of the idle gear, the amount of displacement of the oscillate slider is smaller than in the other regions. Hence, as shown in FIG. 21, the fishing line is wound more in the vicinity of the front and rear end portions (the points a' and g') of the line winding surface 31 than in the other portion.

Also, between the points A' and C', and between the points G' and I', the speed of the oscillate slider gradually increases, while at the points N' and P', the middle of the line winding surface 31, the speed of the oscillate slider is highest. Therefore, between the points C' and D' and between I' and J', the amount of displacement of the oscillate slider is greatest. Therefore, as was described above, in the reciprocation of the spool 29, the highest speed points N' and P' are coincident with each other. Hence, as shown in FIG. 21, the amount of winding of the fishing line at the middle of the line winding surface is smaller.

Hence, it is true that the above-described prior art is improved in line winding condition when compared with the prior art shown in FIG. 19. However, as shown in FIG. 21, the difficulty is not eliminated yet that the line-wound surface 31 is inflated at the front and rear end portions, and recessed at the middle portion.

Figure 22:
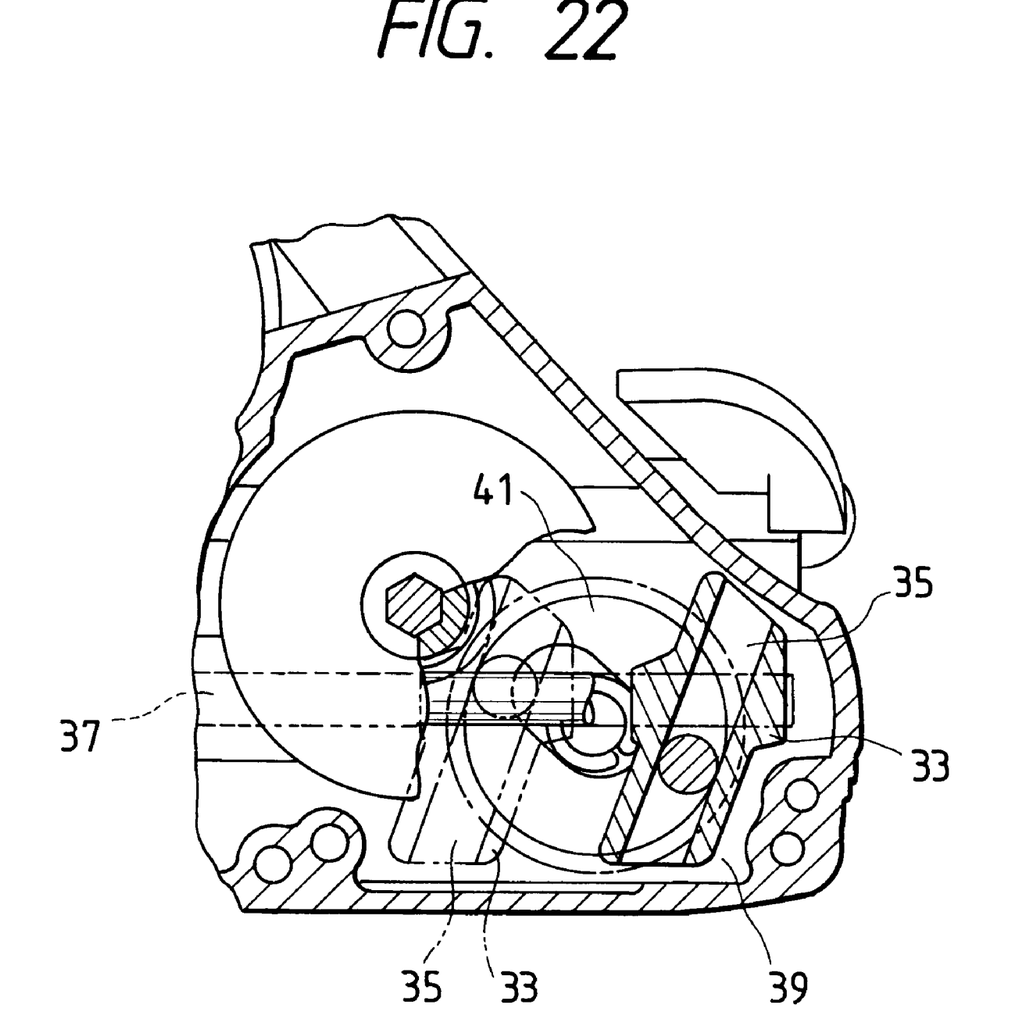
FIG. 22 is a side view of another example of the conventional oscillate mechanism.

On the other hand, Japanese Patent Unexamined Publication No. Hei. 8-154543 has disclosed an oscillate mechanism 39 in which, as shown in FIG. 22, an oscillate groove 35 of an oscillate slider 33 is inclined in a front-to-rear direction of a spool shaft 37.

In the oscillate mechanism 39, the stroke of oscillation can be increased without an increment of the diameter of an idle gear 41. Hence, for given size reel the oscillate mechanism 39 provides a larger winding capacity of a fishing line than the above-described prior arts. However, the oscillate mechanism 39 again suffers from the difficulty that, when the fishing line is wound up on the spool, the line wound surface is inflated at the front and end portions, and recessed at the middle portion. That is, even with the oscillate mechanism 39, the line winding state is not improved at all.

SUMMARY OF THE INVENTION

In view of the foregoing, an object of the invention is to provide a fishing spinning reel in which the oscillate mechanism is improved to improve the method of winding a fishing line on the spool, and thereby to improve the fishing-line throwing performance. A further object is the widen, the oscillate width even with a miniaturized reel body to increase the amount of winding on a fishing line.

The foregoing objects of the invention have been achieved by the provision of a fishing spinning reel including: an oscillate mechanism in which a protrusion is formed on a periphery of an idle gear which turns in association with a rotation of a handle. The protrusion is engaged with an oscillate groove of an oscillate slider which is provided on a rear end side of a spool shaft which has a spool at a top end thereof. This rotation of said handle is converted into a reciprocation of said spool to move said spool back and forth. The oscillate groove includes: an inclined portion which is inclined in the front-to-rear direction of said spool shaft; and straight portions which extend from both ends of said inclined portion in such a manner that said straight portions are substantially perpendicular to said spool shaft.

DETAILED DESCRIPTION OF THE PREFERRED EMBODIMENTS

Embodiments of the invention will be described with reference to the accompanying drawings, in which parts corresponding functionally to those already described with reference to FIG. 19 (the prior art) are therefore designated by the same reference numerals or characters.

Figure 1:
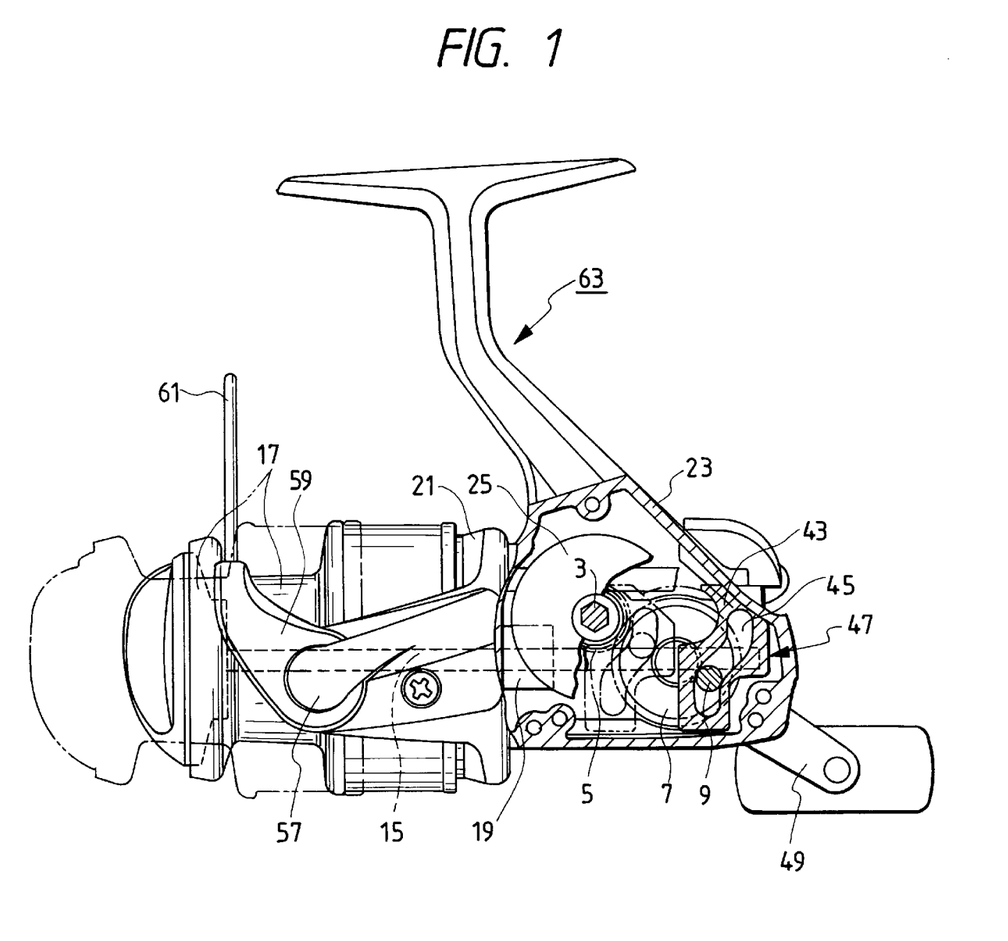
FIG. 1 is a side view, with parts cut away, showing essential components of a fishing spinning reel according to the present invention.
Figure 2:
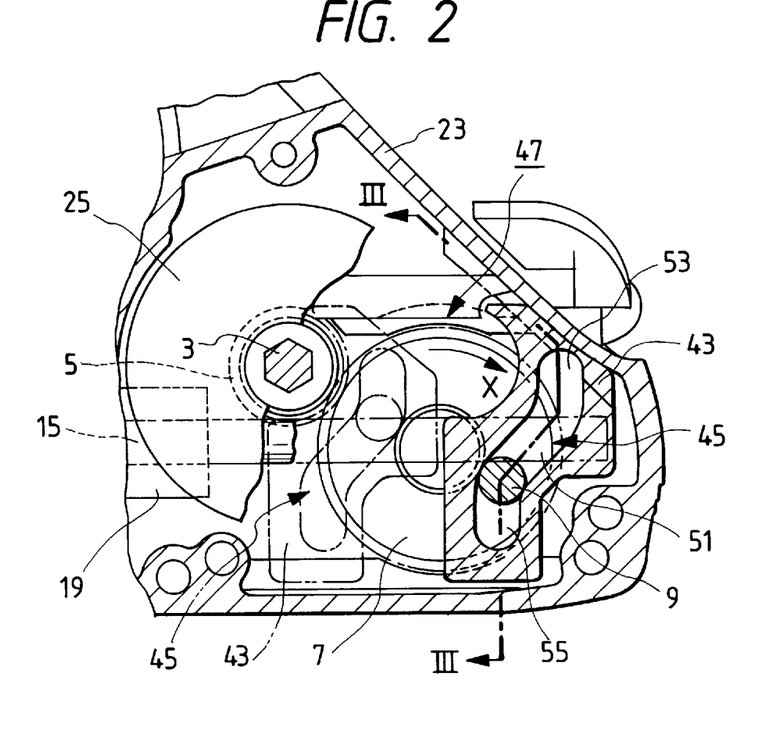
FIG. 2 is an enlarged side view of an oscillate mechanism.
Figure 3:
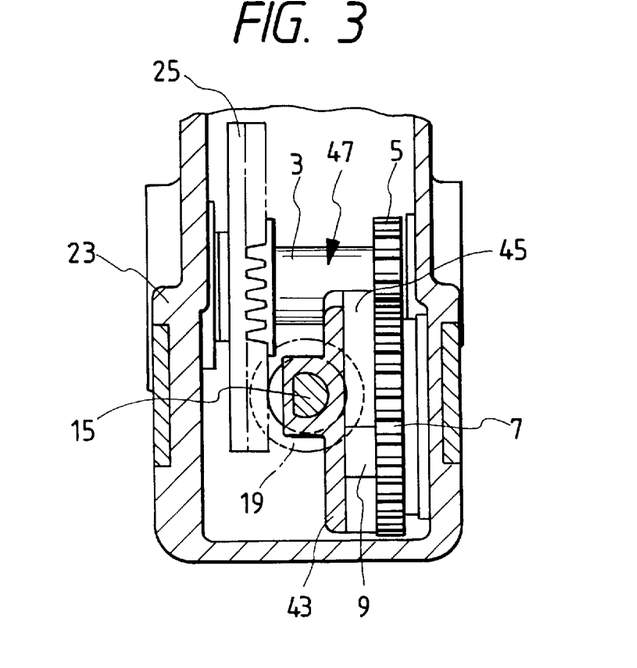
FIG. 3 is a sectional view taken along line III—III in FIG. 2.

FIGS. 1 through 12 show a typical example of a fishing spinning reel. In FIGS. 1 through 3, reference numeral 43 designates a oscillate slider secured to the rear end portion of a spool shaft 15, and a protrusion 9 formed on the periphery of one side of an idle gear 7 is engaged with an oscillate groove 45 formed in the oscillate slider 43. Those element form an oscillate mechanism 47.

Similarly as in the case of the related art shown in FIG. 19, when, in order to take up the fishing line, a rotor 21 is turned with a handle 49 coupled to the reel body 23, as shown in FIG. 2, the idle gear 7 is turned in the direction of the arrow X, so that the protrusion 9 describes a circular orbit, accordingly the oscillate slider 43 causes the spool shaft 15 to move along the oscillate groove 45 back and forth thereby to reciprocate the spool 17 in the same direction. In the embodiment, as described later, the oscillate groove 45 is in the form of a crank for improving the condition of winding a fishing line on the spool 17. Even with the reel body 23 miniaturized, the amount of winding of a fishing line is increased. This is one of the specific features of the invention.

That is, as shown in FIG. 2, the oscillate groove 45 is made up of a middle portion, namely, an inclined portion 51 which is inclined at an angle of 45° with respect to the spool shaft 15 (in the front-to-rear direction); and two straight portions 53 and 55 which extend substantially straightly vertically (upwardly and downwardly) respectively from both ends of the inclined portion 51.

Figure 4:
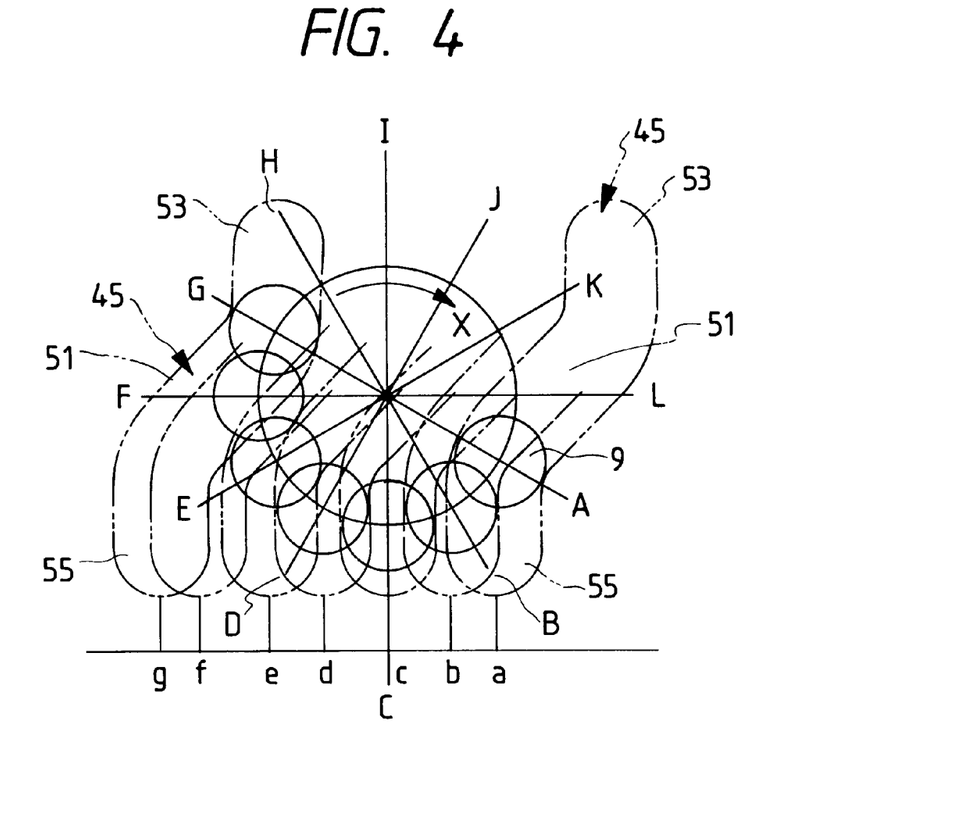
FIG. 4 is a diagram for a description of the abutment of a protrusion and an oscillate groove every angle of rotation of 30° of an idle gear.
Figure 5:
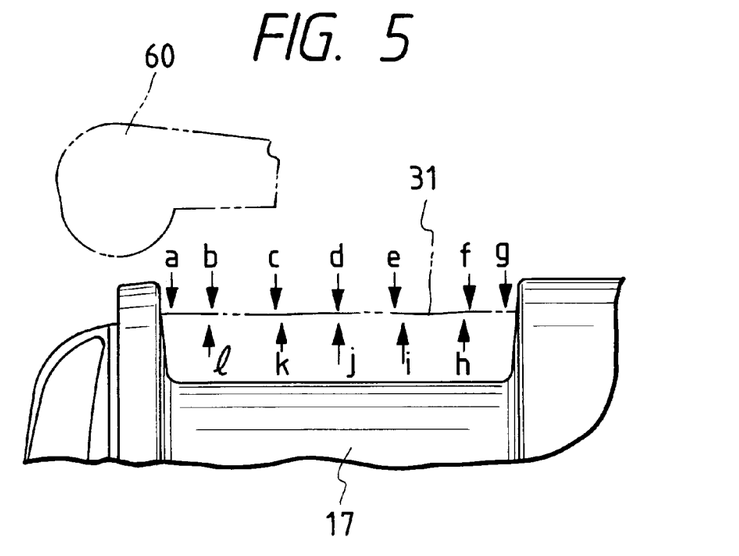
FIG. 5 is an explanatory diagram showing line-winding positions of the spool which correspond to the points A through L in FIG. 4.
Figure 6:
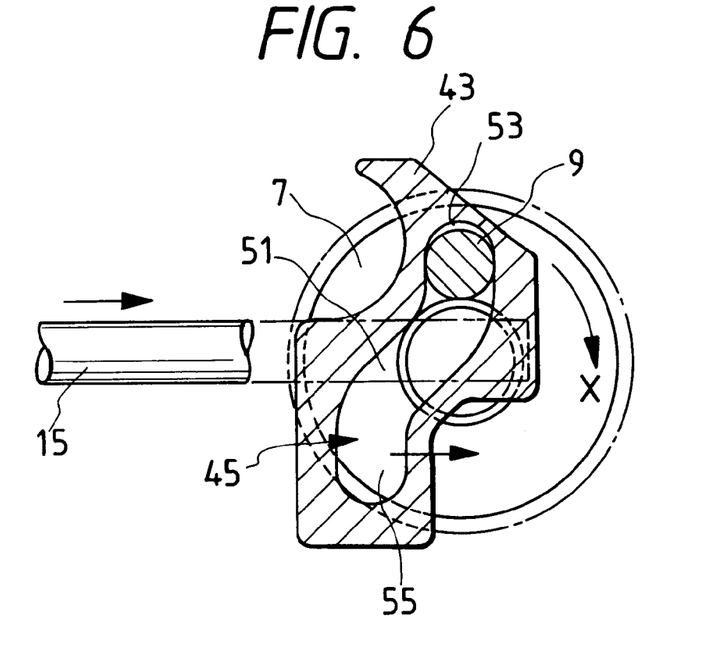
FIG. 6 is a diagram outlining the state of the oscillate mechanism which corresponds to the point I in FIG. 4.
Figure 7:
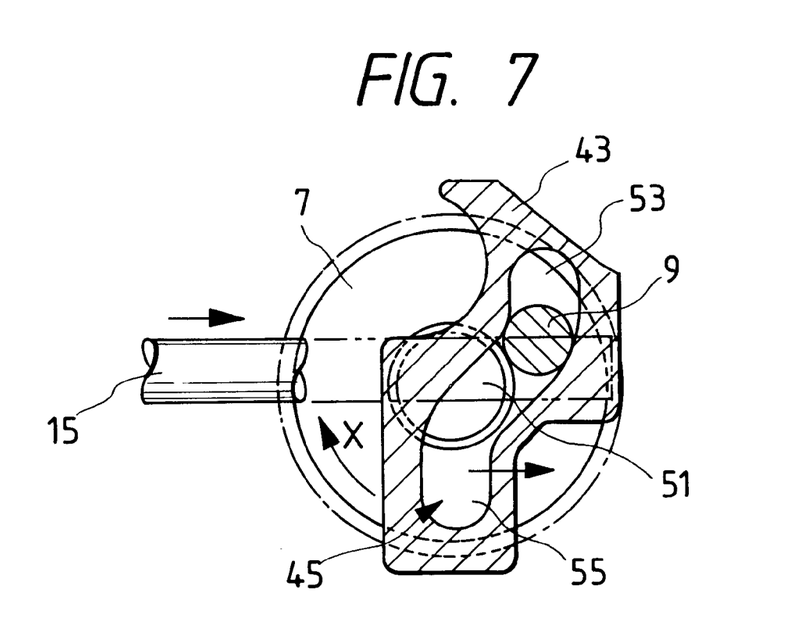
FIG. 7 is a diagram outlining the state of the oscillate mechanism which corresponds to the point K in FIG. 4.

FIG. 4 shows the abutment of the protrusion 9 against the oscillate groove 45 every at rotation increment of 30° of the idle gear 7 which is turned with the handle 49. FIG. 5 shows line winding positions of the spool 17 which correspond to the points A through L in FIG. 4. In FIG. 4, the point I is such that, as shown in FIG. 6, the protrusion 9 engages with the straight portion 53 of the oscillate groove 45. This point is the highest speed point of the straight portion 53 at the time of retraction of the spool 17. At the point K, as shown in FIG. 7, the protrusion 9 engaged with the oscillate groove 45 moves from the straight portion 53 over to the inclined portion 51. At the inclined portion 51, as indicated by a graphical representation of FIG. 12 (described later), the retraction of the oscillate slider 43 is accelerated by means of the inclined portion 51.

Figure 8:
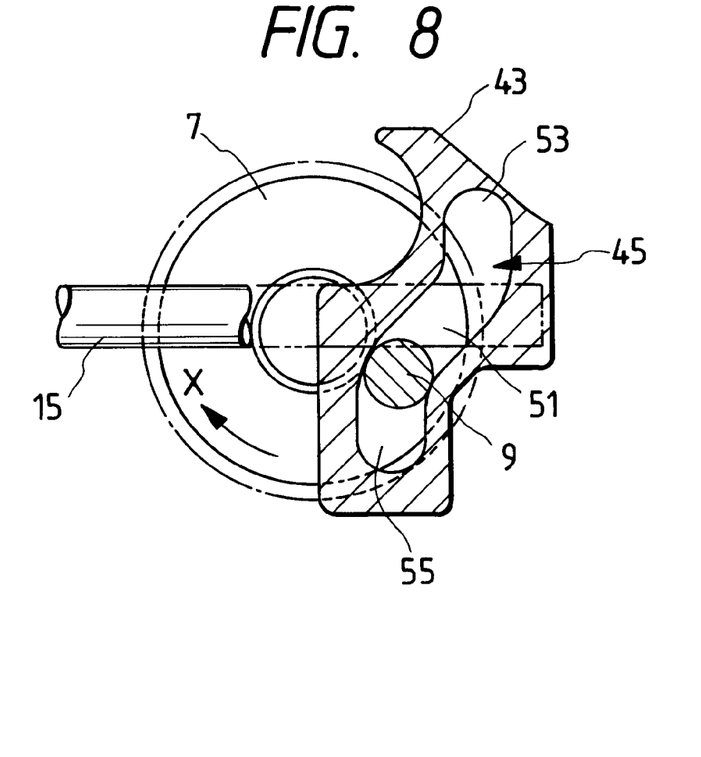
FIG. 8 is a diagram outlining the state of the oscillate mechanism which corresponds to the point A in FIG. 4.

As is seen from FIG. 4, at the point A, the protrusion 9 switches from the inclined portion 51 to the lower straight portion 55. In the embodiment, because of the configuration of the oscillate groove 45, the point A is the stroke rearmost end (position a') of the spool 17 as shown in FIGS. 5 and 8.

Figure 9:
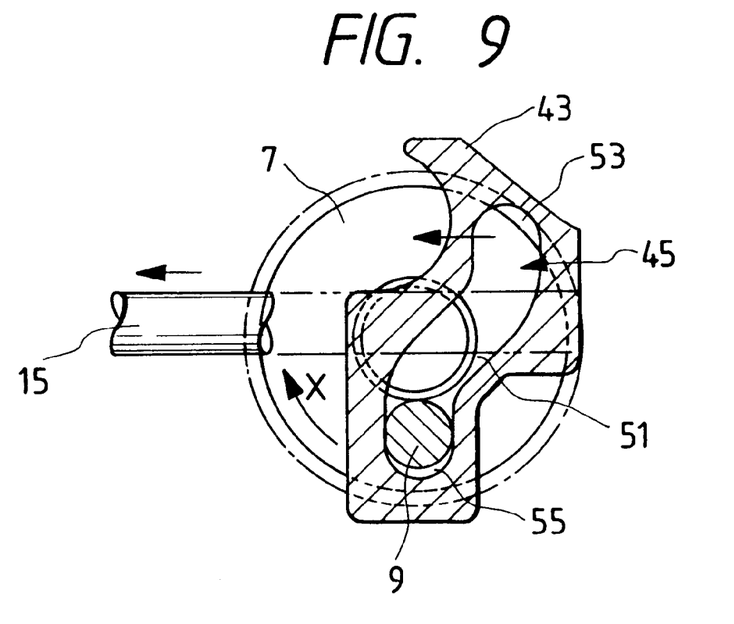
FIG. 9 is a diagram outlining the state of the oscillate mechanism which corresponds to the point C in FIG. 4.
Figure 10:
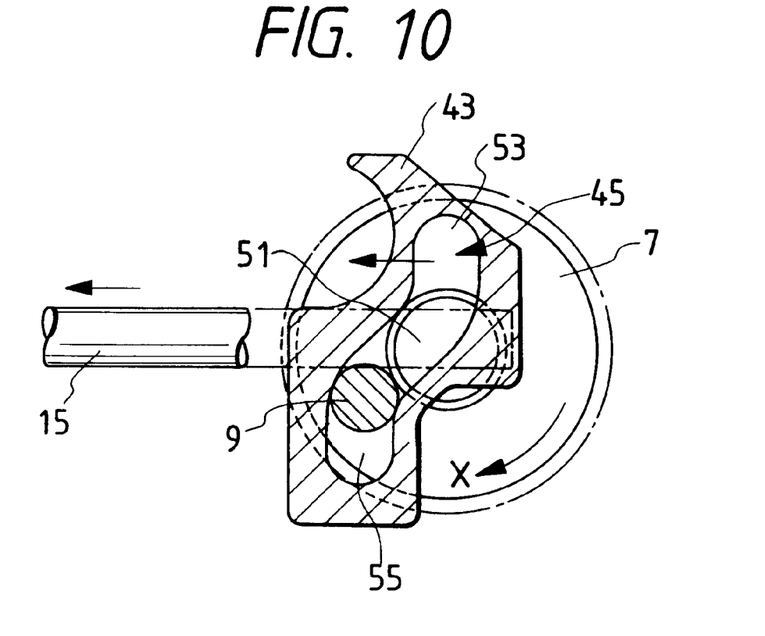
FIG. 10 is a diagram outlining the state of the oscillate mechanism which corresponds to the point E in FIG. 4.

The point C of FIG. 4 is such that, as shown in FIG. 9, the protrusion 9 engages with the straight portion 55 of the oscillate groove 45, and the speed of forward movement is highest at the time the protrusion 9 engages the straight portion 55. And at the point E, the protrusion 9 switches from the straight portion 55 to the inclined portion 51 as shown in FIG. 10, and as is seen from FIG. 12, the oscillate slider 43 (moving forwardly) is accelerated by the inclined portion 51 at the point E.

Figure 11:
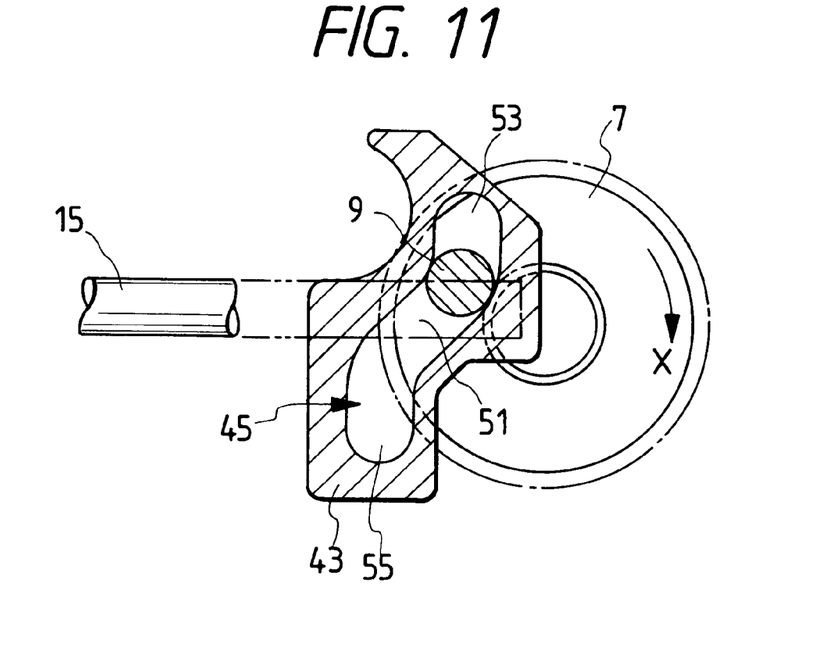
FIG. 11 is a diagram outlining the state of the oscillate mechanism which corresponds to the point G in FIG. 4.

Furthermore, at the point G, as shown in FIG. 11, the protrusion 9 is switched from the inclined portion 51 to the straight portion 53. The point G is the frontmost point of the stroke of the spool 17 indicated by the point g of FIG. 5.

Figure 12:
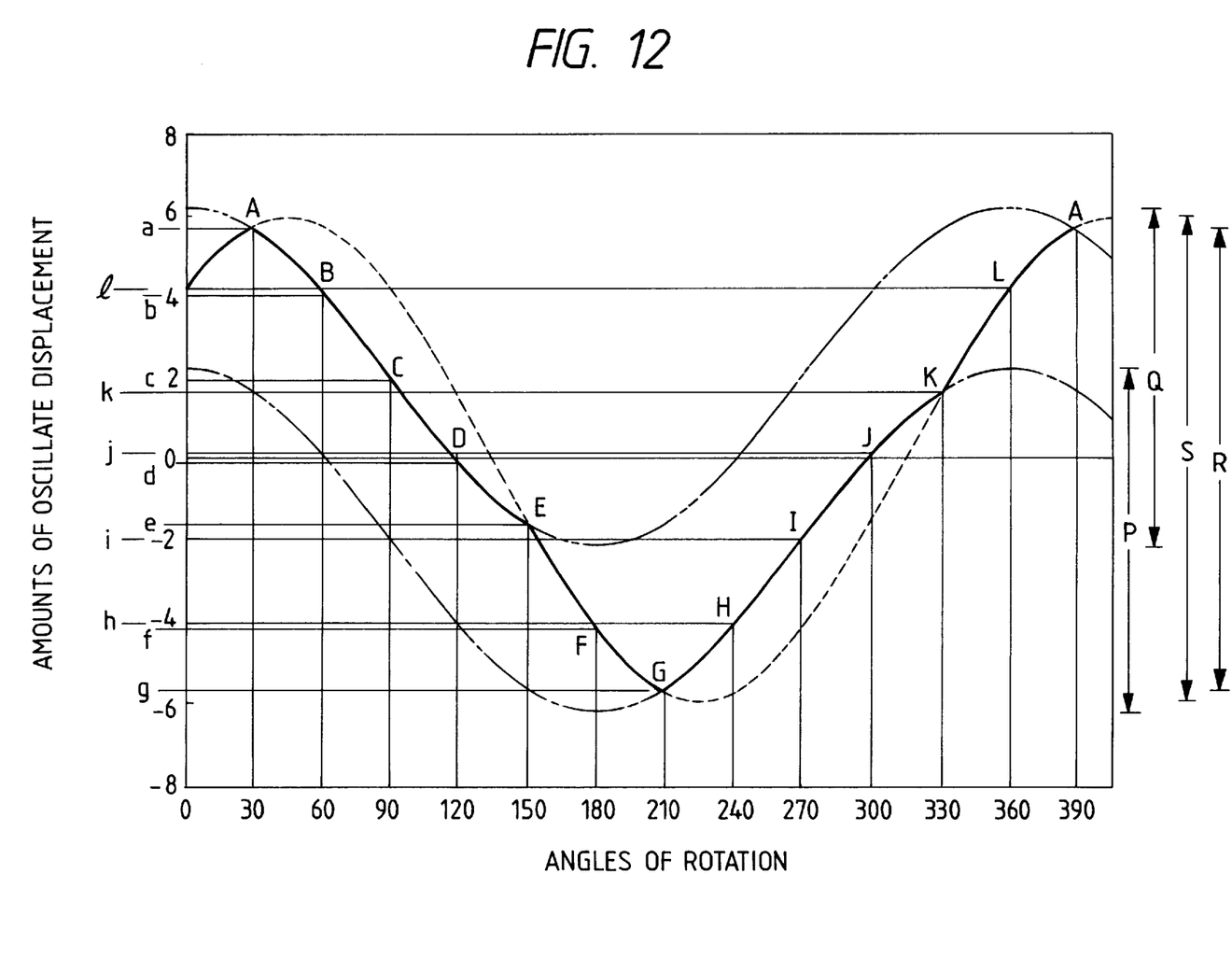
FIG. 12 is a graphical representation indicating oscillate displacements with angles of rotation of the idle gear.

FIG. 12 is a graphical representation indicating the oscillate displacements which are due to the rotation of the idle gear 7 which has been described with reference to FIGS. 4 through 11. In FIG. 12, the vertical axis represents amounts of oscillate displacement, and the horizontal axis represents angles of rotation of the idle gear 7. Reference characters A through L correspond to the points A through L in FIG. 4, and reference characters a through 1 on the vertical axis indicate the line winding positions of spool 17 which correspond to the points A through L in FIG. 4.

In FIG. 12, a broken line is a phantom line indicating oscillate displacements in the case where the inclined portion 51 is further extended above and below the idle gear 7; a one-dot chain line is a phantom line indicating oscillate displacements in the case where the straight portion 53 is extended downwardly of the idle gear 7; and a two-dot chain line is a phantom line indicating oscillate displacements in the case where the straight portion 55 is extended upwardly of the idle gear 7. The oscillate displacements of the embodiment are indicated by the solid line.

Now, the graphical representation of FIG. 12 will be described in more detail.

As was described with reference to FIGS. 4 through 11, between the points A and E, the protrusion 9 engages with the straight portion 55 of the oscillate, groove 45. Hence, as the idle gear 7 is turned with the handle from the point A to the point E in the direction of arrow X to cause the protrusion 9 to draw a circular orbit, the oscillate slider 43 causes the spool shaft 15 to move along the straight portion 55 forwardly to thereby move the spool 17 in the same direction. This action corresponds to reference characters A through E in FIG. 12. The spool 17 is moved forwardly of the reel body 23 along the phantom line of the oscillate displacements of the straight portion 55.

At the point E, the protrusion 9 switches from the straight portion 55 to the inclined portion 51. The protrusion 9 engages with the inclined portion 51 while the idle gear turns from the point E to the frontmost point G of the stroke of the spool 17. This action corresponds to reference characters E through G. In this interval, the spool 17 is moved forwardly along the phantom line of the oscillate displacements of the inclined portion 51.

As was described with reference to FIG. 4, while the idle gear 7 turns from the point G to the point K, the protrusion 9 engages with the straight portion 53. This action corresponds to reference characters G through K of FIG. 12; that is, the spool 17 is moved backwardly along the phantom line of oscillate displacements of the straight portion 53. And, the protrusion 9 engaged with the oscillate groove 45 moves in the inclined portion 51 from the point K to the point A. This action corresponds to reference characters K through A of FIG. 12. The spool 17 is moved to the rearmost end of the stroke of the spool 17 along the phantom line of oscillate displacements of the inclined portion 51.

In FIG. 1, reference numeral 57 designates a supporting arm integral with the rotor 21; and 59, a bail supporting member which is rotatably mounted on the end of the supporting arm 57. A semi-circular bail 61 is mounted on the bail supporting member 59 and a bail supporting member 60 which is mounted on the other supporting arm (not shown), in such a manner that the semi-circular bail 61 is swingable to a fishing-line take-up position and a fishing-line let-out position.

The fishing spinning reel 63 of the invention is constructed as described above. Therefore, similarly as in the case of the conventional reel, when the terminal tackles are thrown with the bail 61 set at the fishing-line let-out position, the fishing line is spirally let out of the spool 17. When, with the bail 61 set at the fishing-line take-up position, the handle 49 is operated to turn the rotor 21 in the fishing-line take-up-direction, the fishing line is wound on the spool 17 which the above-described oscillate mechanism reciprocates back and forth.

The reciprocation of the spool 17 is as follows: While the idle gear 7 is turned from the point A to the point E in FIG. 4., the protrusion 9 engages with the straight portion 55 of the oscillate groove 45, and therefore as shown in FIG. 12 the spool 17 is moved forwardly of the reel body 23 along the phantom line of oscillate displacements of the straight portion 55. At the-point C between the points A and E the speed of the spool 17 becomes highest.

As shown in FIG. 12, at the switching point E of the protrusion 9 from the straight portion 55 and the inclined portion 53, the spool 17 is shifted to the phantom line of oscillate displacements of the inclined portion 53 and accelerates. Therefore, when the fishing line is wound on from this point to the frontmost point G, the line winding position e to the line winding position g, the amount of displacement of the spool 17 is larger than that of the prior art.

When the spool 17 reaches the frontmost point G of the stroke, as shown in FIG. 12, it is moved from the phantom line of oscillate displacements of the inclined portion 51 to the phantom line of oscillate displacements of the straight portion 53. Therefore the retraction of the spool 17 is quickly achieved in a switching mode; that is, the spool 17 is quickly moved backwardly by the straight portion 53.

Until the idle gear 7 turns to the point K, the protrusion 9 of the idle gear 7 engages with the straight portion 53, and therefore as shown in FIG. 12, the spool 17 is moved backwardly along the phantom line of oscillate displacements of the straight portion 53. At the point I between the points G and K the speed of the spool 17 becomes highest.

Thereafter, at the point K where the protrusion 9 is switched from the straight portion 53 to the inclined portion 51, the spool 17 is moved to the phantom line of oscillate displacements of the incline portion 51 and accelerated, and therefore when the fishing line is wound on from the line winding position k to a, the amount of displacement of the spool 17 is large. The above-described operation is repeatedly carried out in the same manner, so that the fishing line is wound on the spool.

As is apparent from the solid line of oscillate displacements in FIG. 12 and from FIG. 5, in the embodiment the highest speed points C and I in the reciprocation of the spool 17 at the straight portions 53 and 55 do not coincide in a center position of the line winding surface with each other; that is, they are located before and after the center position.

Furthermore, when the fishing line is wound on the region between the line winding positions e through g and on the region between the line winding position k and a, the pool 17 is accelerated when the fishing line is wound on the line winding positions e and k, and therefore in the region, the amount of displacement of the spool 17 is larger than that of the prior art.

At the frontmost point G and the rearmost point A of the stroke, the spool 17 is moved from the phantom line of oscillate displacements of the inclined portion 51 to the phantom line of oscillate displacements of the straight positions 53, 55. Hence, thereafter the switching operation and the movement of the spool are quickly achieved.

As shown in FIG. 5, when the spool 17 is moved forwardly from the point a through the point d to the point g, the amount of displacement in those intervals is equal to that when the spool 17 is moved backwardly from the point g through the point j to the point a, although the displacements opposite in direction.

Hence, in the embodiment, the fishing line is uniformly wound on the spool 17 from the frontmost end to the rearmost end which is reciprocated back and forth. As a result, as shown in FIG. 5, the line wound surface 31 of the spool 17 is uniform and flat. Therefore, the fishing line wound thereon will never collapse; that is, the fishing line can be smoothly let out when necessary.

As shown in FIG. 12, the oscillate width R of the embodiment indicated by the solid line is larger than the oscillate width P of the phantom line of the straight portion 53 indicated by the one-dot chain line and larger than the oscillate width Q of the phantom line of the straight portion 55 indicated by the two-dot chain line. In the embodiment, its oscillate width is substantially equal to the oscillate width S of the phantom line of the inclined portion 51 indicated by the broken line.

Hence, the embodiment of the invention is free from the difficulties accompanying the prior art shown in FIG. 22. And similarly as in the case of the prior art, in the embodiment of the invention, the reel body is miniaturized, and the oscillate width is increased.

Figure 13:
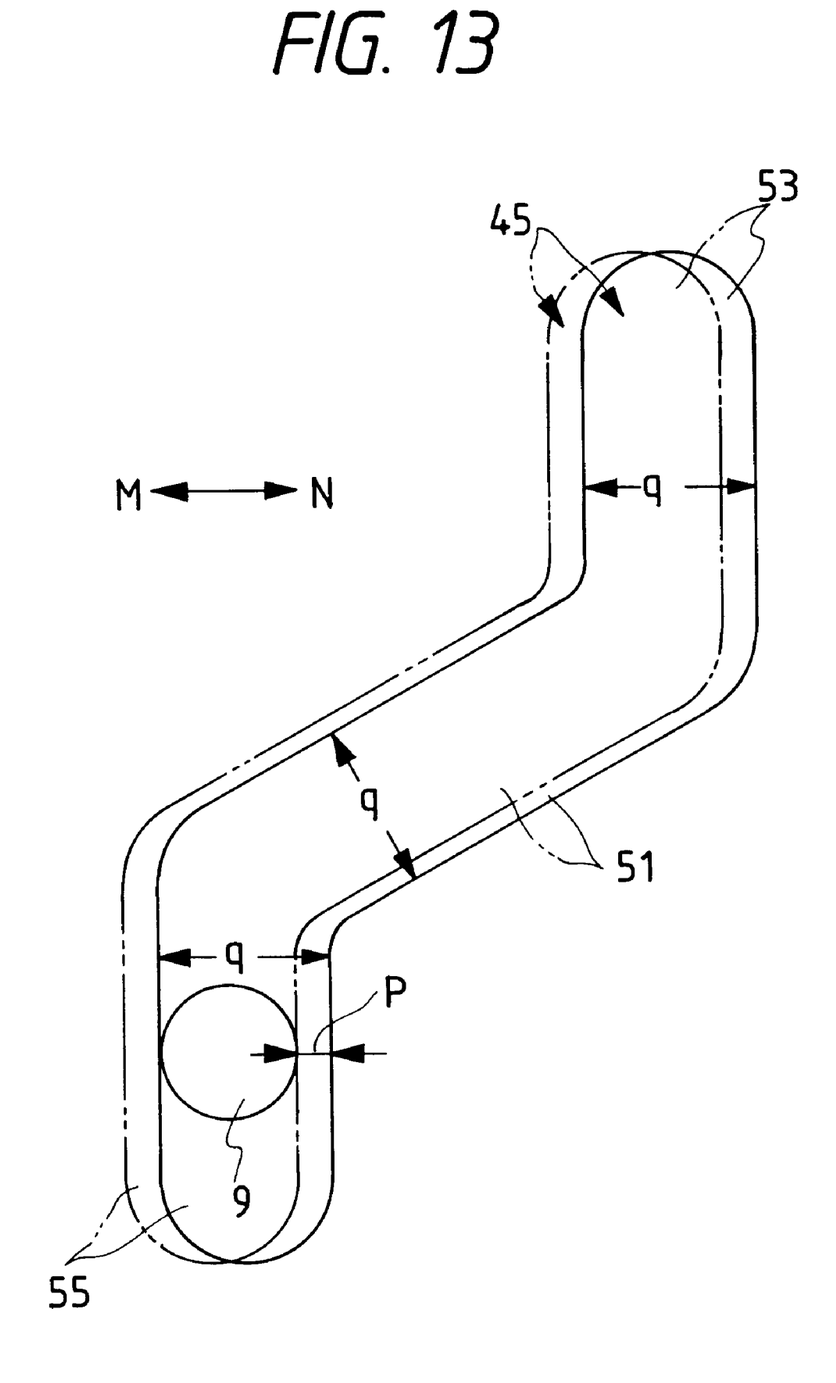
FIGS. 13 and 14 are explanatory diagrams for a description of the play of a spool.

On the other hand, in the manufacture of the above-described fishing spinning reel, in order to allow the spool 17 to smoothly move back and forth, as shown in FIG. 13, it is necessary to provide a slight clearance p between the oscillate groove 45 and the protrusion 9 which is engaged with the oscillate groove 45.

Hence, in the actual product, the spool 17 has a play in the direction of the axis thereof (in the directions of the arrows M and N in FIG. 13). If, in the above-described crank-shaped oscillate groove 45, the straight portions 53 and 55 and the inclined portion 51 are equal in groove width q with each other, the following difficulty is involved: That is, the case where the protrusion 9 moves along the straight portions 53 and 55 is different in the play of the spool from the case where the protrusion 9 moves along the inclined portion 51.

That is, in the case where, in the oscillate groove 45, the straight portions 53 and 55 are equal in groove width q to the inclined portion 51, and for instance the inclined portion 51 is inclined at 45° as in the case of the embodiment, the clearance p between the oscillate groove 45 and the protrusion 9 corresponds to the play in the straight portions 53 and 55.

Figure 14:
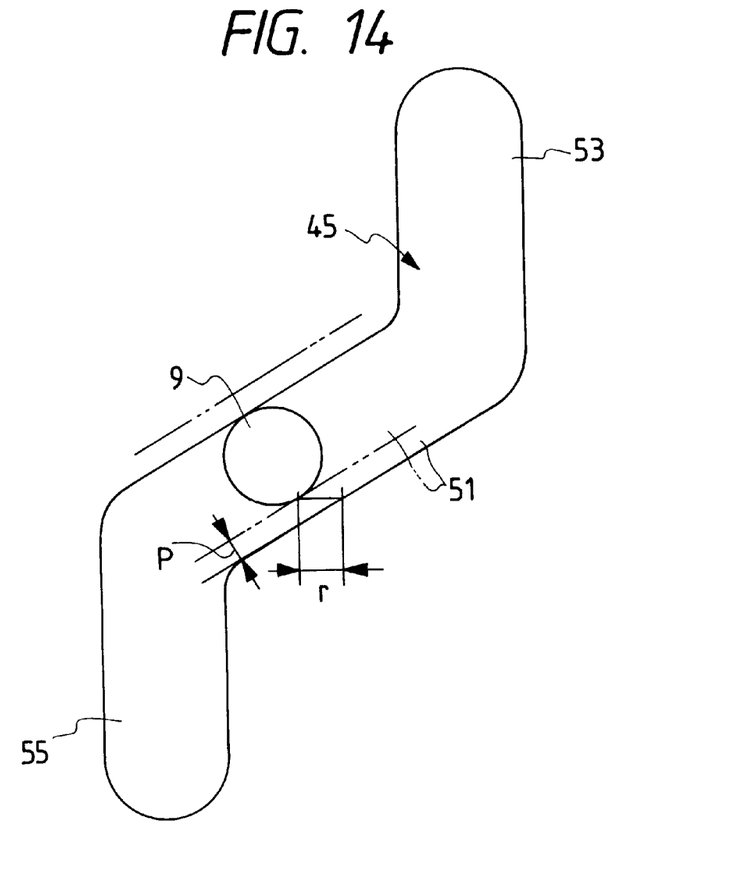
Figure 15:
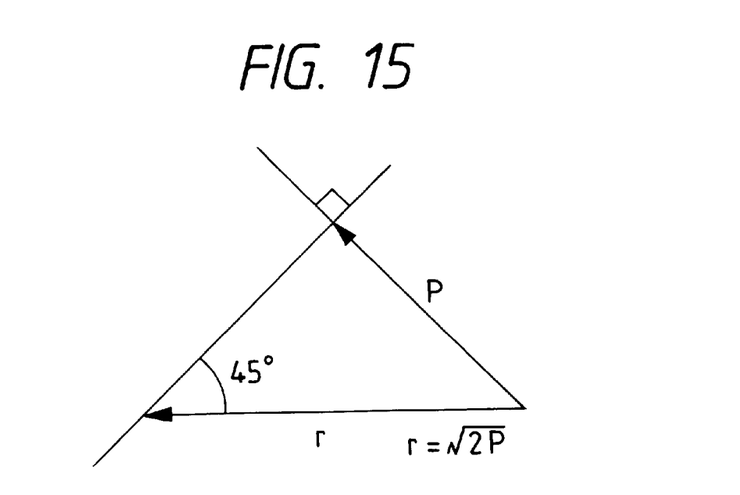
FIG. 15 is an explanatory diagram for a description of the difference between plays.

However, the play r in the inclined portion 51 as shown in FIG. 14, is √2 times as much as the play p in the straight portions 53 and 55 as shown in FIG. 15, whereby a difference in the play from the straight portions 53 and 55 results. Further, as the angle of inclination of the inclined portion 51 increases, the difference between those plays is increased.

During an actual fishing operation, the fishing line is not always fully wound up with the handle; that is, the fishing line winding operation is carried out in various stages, for example, casting and winding the fishing line, and the fishing line winding operation is suspended, and the rod is swung again, and the handle is operated again to take up the fishing line.

Hence, if there is a difference between the play p of the straight portions 53 and 55 and the play r of the inclined portion 51, the following difficulty is involved: As in the case of the above-described embodiment, even if, with the oscillate groove 45 made substantially crank-shaped, it is tried to make the line wound surface uniform which is formed by winding the fishing line on the spool 17, the fishing line wound on the spool 17 is unstable in position, so that the line wound surface is rough.

Figure 16:
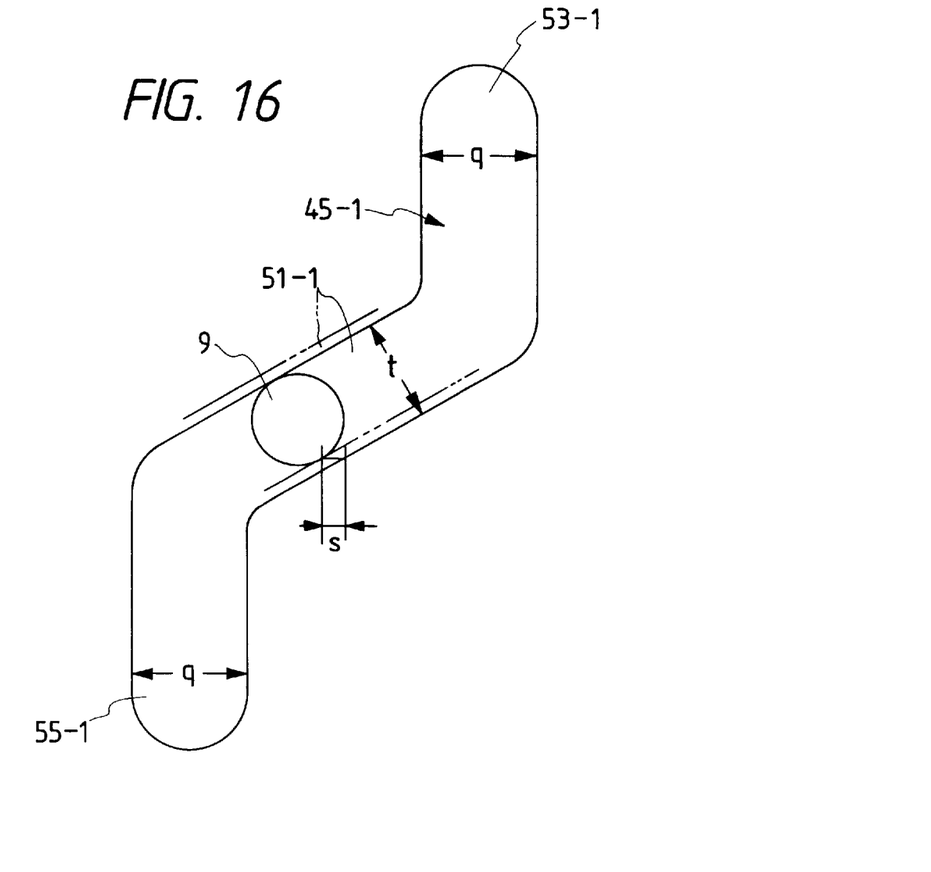
FIGS. 16 to 18 are explanatory diagrams for a description of an oscillate groove in an embodiment of the present invention.

Hence, the fishing spinning reel of the present invention is designed as follows: As shown in FIG. 16, the groove width q of the straight portions 53-1 and 55-1 of an oscillate groove 45-1, which is in the form of a crank, is equal to that of the above-described straight portions 53 and 55, and the groove width t of the inclined portion 51-1 is smaller than that q of the straight portions 53-1 and 55-1 (q>t) so that the play s of the inclined portion 51-1 is equal to the play p of the straight portions 53-1 and 55-1. The other arrangements are equal to those of the above-described embodiment (described with reference to FIGS. 1 through 12). Hence, parts corresponding functionally to those already described with reference to the embodiment are therefore designated by the same reference numerals or characters.

In the aforementioned fishing spinning reel, too, the spool 17 is moved back and forth by the circular motion of the protrusion 9 attributing to the operation of the handle. With the fishing spinning reel, similarly as in the above-described embodiment, the object of the invention can be achieved. Furthermore, since there is no difference between the play of the inclined portion 51-1 and that of straight portions 53-1 and 55-1 with respect to the spool 17, the fishing line is uniformly wound on the spool 17. Hence, in case that the fishing spinning reel of this embodiment is manufactured, the object of the invention which improves the winding condition of the fishing-line can be effectively achieved.

Figure 17:
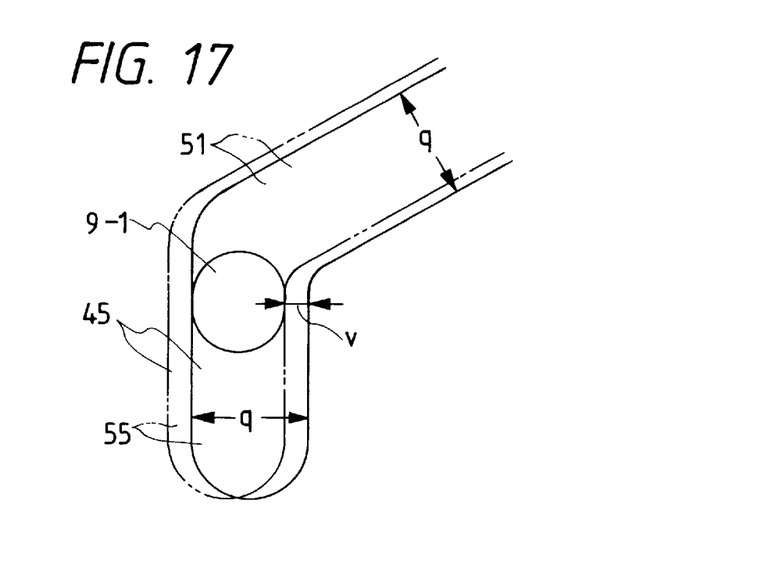
Figure 18:
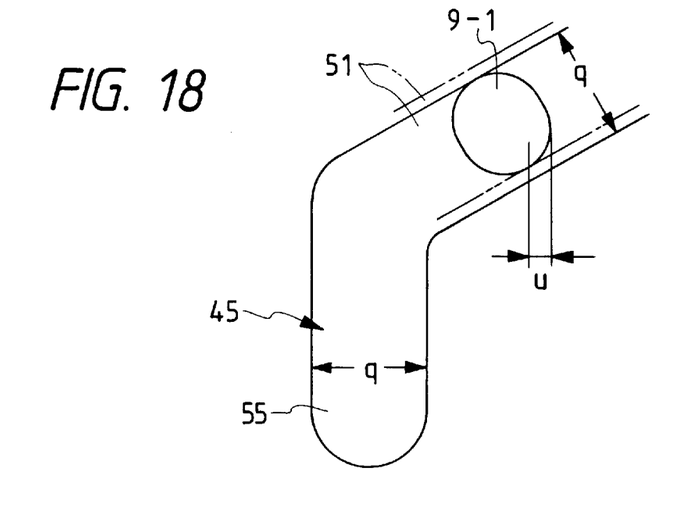

FIGS. 17 and 18 are for a description of the fishing spinning reel which corresponds to claims 1, 2 and 4. In the fishing spinning reel, the protrusion 9 engaged with the oscillate groove 45 shown in FIG. 13 is improved. That is, a protrusion 9-1 is made elliptic in such a manner that, when it engages with the inclined portion 51, its major axis is perpendicular to the inclined portion 51 so that, in FIG. 18, the play u of the inclined portion 51 is equal to the play v of the straight portion 53.

For instance, it is assumed that the angle of inclination of the inclined portion 51 is 45°, and the play v is 1 mm. In this case, in order to make the play u of the inclined portion equal to the play v, the following expression may be employed:

$$1 - 1 \cdot \cos 45° \approx 0.3$$

That is, the difference between the major and minor axes of the protrusion 9-1 should be made 0.3 mm.

The other arrangements are equal to those of the above-described embodiment shown in FIGS. 1 through 12.

In the fishing spinning reel, too, similarly as in the case of the one shown in FIG. 16, the play of the inclined portion 51 is equal to that of the straight portion 55, and therefore the fishing line is uniformly wound on the spool as required.

The foregoing description of the preferred embodiments of the invention has been presented for the purpose of illustration and description only. It is not intended to be exhaustive or to,limit the invention to the precise form disclosed, and modifications and variations are possible in light of and within the scope of the invention. The preferred embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and equivalents thereof.

What is claimed is:

1. An oscillate mechanism for a fishing spinning reel, said spinning reel having a spool linearly reciprocating in association with a rotation of a handle through an idle gear, said oscillate mechanism comprising:

a protrusion formed on a periphery of said idle gear; and an oscillate slider fixedly mounted to a rear end side of a spool shaft, which has said spool at a front end thereof, said oscillate slider having an oscillate groove engaged with said protrusion for converting said rotation of said handle into a linear reciprocation of said spool, said oscillate slider reciprocating linearly in an axial direction of and fixedly with respect to said spool shaft, wherein said oscillate groove comprises:

an inclined portion which is inclined with respect to said axial direction of said spool shaft; and straight portions which extend respectively from each end of said inclined portion in such a manner that said straight portions are substantially perpendicular to said spool shaft.

2. An oscillate mechanism as claimed in claim 1, wherein a time instant that said protrusion moves from said inclined portion of said oscillate groove to one of said straight portions corresponds to a switching point at which said reciprocation of said spool changes direction.

3. An oscillate mechanism for a fishing spinning reel, said spinning reel having a spool linearly reciprocating in association with a rotation of a handle through an idle gear, said oscillate mechanism comprising:

a protrusion formed on a periphery of said idle gear; and an oscillate slider provided on a rear end side of a spool shaft, which has said spool at a front end thereof, said oscillate slider having an oscillate groove engaged with said protrusion for converting said rotation of said handle into a linear reciprocation of said spool, wherein said oscillate groove comprises:

an inclined portion which is inclined with respect to an axial direction of said spool shaft; and straight portions which extend respectively from each end of said inclined portion in such a manner that said straight portions are substantially perpendicular to said spool shaft; and wherein a groove width of said inclined portion of said oscillate groove is smaller than a groove width of said straight portions of said oscillate groove.

4. An oscillate mechanism as claimed in claim 3, wherein a time instant that said protrusion moves from said inclined portion of said oscillate groove to one of said straight portions corresponds to a switching point at which said reciprocation of said spool changes direction.

5. An oscillate mechanism for a fishing spinning reel, said spinning reel having a spool linearly reciprocating in association with a rotation of a handle through an idle gear, said oscillate mechanism comprising:

a protrusion formed on a periphery of said idle gear; and an oscillate slider provided on a rear end side of a spool shaft, which has said spool at a front end thereof, said oscillate slider having an oscillate groove engaged with said protrusion for converting said rotation of said handle into a linear reciprocation of said spool, wherein said oscillate groove comprises:

an inclined portion which is inclined with respect to an axial direction of said spool shaft; and straight portions which extend respectively from each end of said inclined portion in such a manner that said straight portions are substantially perpendicular to said spool shaft; and wherein said protrusion of said idle gear which engages with said oscillate groove is shaped as an ellipse in cross-section, such that, when said protrusion engages with said inclined portion, a major axis of the ellipse is perpendicular to a direction in which said inclined portion extends.

6. An oscillate mechanism as claimed in claim 5, wherein a time instant that said protrusion moves from said inclined portion of said oscillate groove to one of said straight portions corresponds to a switching point at which said reciprocation of said spool changes direction.

* * * * *